No. 850,123. PATENTED APR. 16, 1907.
A. J. ALGATE.
MINNOW TRAP.
APPLICATION FILED SEPT. 10, 1906.

Witnesses,
Inventor,
A. J. Algate,

UNITED STATES PATENT OFFICE.

ARTHUR JOHN ALGATE, OF TORONTO, ONTARIO, CANADA.

MINNOW-TRAP.

No. 850,123.   Specification of Letters Patent.   Patented April 16, 1907.

Application filed September 10, 1906. Serial No. 334,043.

*To all whom it may concern:*

Be it known that I, ARTHUR JOHN ALGATE, of the city of Toronto, in the county of York, in the Province of Ontario, Canada, have invented certain new and useful Improvements in Minnow-Traps, of which the following is a specification.

My invention relates to improvements in minnow-traps; and the object of the invention is to devise a form of trap which may be readily collapsed and occupy but little space when collapsed, and therefore be conveniently packed and carried.

Further objects are to devise a trap which may be readily drained when raised out of the water and the minnows quickly recovered from either end.

My invention consists of three plates of celluloid connected together so as to be substantially triangular in cross-section, the bottom being perforated and the apex being provided with a handle and ends of plates being bent inwardly to form funnel-shaped ends, the celluloid being preferably transparent and the parts being otherwise constructed and arranged as hereinafter more particularly explained.

Figure 1:
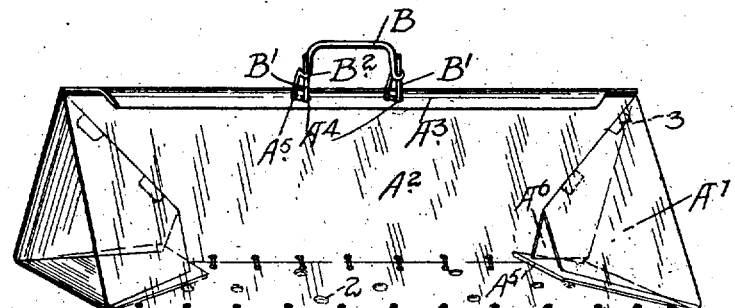
Figure 2:
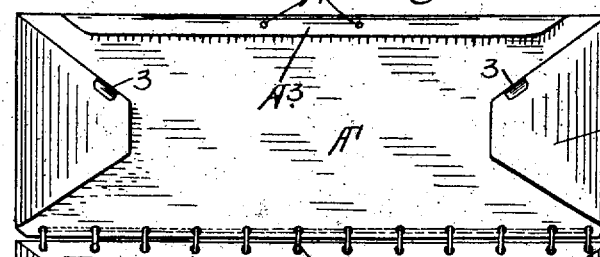
Figures 3, 4:
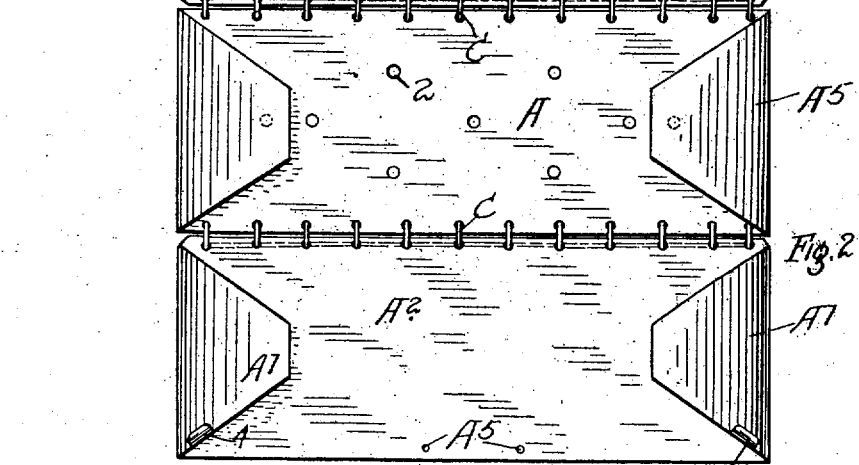

Figure 1 is a perspective view of my minnow-trap complete. Fig. 2 is a plan view showing the trap in collapsed form spread out. Fig. 3 is a view of the trap in a collapsed form. Fig. 4 is a cross-section through the trap.

In the drawings like letters of reference indicate corresponding parts in each figure.

A, A', and A² are the three sides of my minnow-trap, which are preferably made of transparent celluloid, the side A forming the bottom and the sides A' and A² the sides, which meet in an apex at the top.

The side A' is provided with an overlying flap A³, which has holes A⁴ intermediate of its length registering with holes in the side A' and holes A⁵ in the side A² in order to provide for the attaching of the wire handle B, which is of any suitable form and has the lower ends formed up so as to pass through the flap A³, side A', and side A², and thereby hold the trap together.

The handle B is readily detachable at the ends, being provided with a form of hook-shaped end B', the major portion of which being located in an offset B² in the wire, from which it may be readily detached, so that the handle may be released.

The bottom A is provided with perforations 2, as shown, in order to allow of the quick draining of the trap when it is withdrawn from the water and also quick sinking.

The sides A' and A² are connected to the side A by means of any suitable form of lacing C, as indicated. Such lacing may be readily undone, if desired.

The ends of the sides A, A', and A², respectively, are provided with substantially triangular flaps A⁵, A⁶, and A⁷. The flaps A⁶ are provided with lips 3, which are designed to straddle the upper edge of the flaps A⁷ when the trap is set up, and the flaps A⁷ are provided with lips 4, which are likewise designed to straddle the upper edge of the flaps A⁶ when the trap is set up, thereby holding the flaps in substantially a pyramidal funnel form. The lower flap A⁵, it will be seen, is free from the upper flaps and unconnected to them, and for this reason I am enabled to readily depress this flap when it is desired to extract the minnows. It is of course to be understood that the flaps are folded in the celluloid and that the natural spring of the celluloid and the lips 3 and 4 serve to hold these flaps A⁵, A⁶, and A⁷ together in the form shown in Fig. 1, which is a substantially funnel form, such funnel extending inwardly, as indicated.

It will be readily seen on reference to Fig. 2, as well as Fig. 3, that the trap may be collapsed or knocked down into convenient size ready for carrying. This is particularly indicated in Fig. 3, and from this figure it will be seen that the size of the case necessary to carry the trap, if a case is required, would be small.

Although I have shown my minnow-trap as composed of three sides, it will of course be understood that it may be made with a greater number of sides without departing from the spirit of my invention.

In placing my trap in the water it of course does not matter when deposited on what side it falls on, as it is equally efficient from any side.

What I claim as my invention is—

1. A minnow-trap comprising sides flexibly connected together at the edges and having inwardly-extending end flaps forming funnel-shaped ends one of said end flaps having movement in relation to the other flaps as and for the purpose specified.

2. A minnow-trap comprising sides flexibly connected together at the edges and having inwardly-extending end flaps forming funnel-shaped ends, and a supplemental flap at the edge of one side overlying the adjacent side, and means for connecting these two sides and the supplemental flap together as and for the purpose specified.

3. A minnow-trap comprising sides flexibly connected together at the edges and having inwardly-extending end flaps forming funnel-shaped ends, and a supplemental flap at the edge of one side overlying the adjacent side, and a wire handle extending through holes in the connected sides and overlying flap as and for the purpose specified.

4. A minnow-trap comprising sides connected together at the edges and having inwardly-extending end flaps forming funnel-shaped ends, one of said flaps having self-closing movement in relation to the others when moved therefrom, substantially as described.

5. A minnow-trap comprising sides connected together and inwardly-extending end flaps forming funnel-shaped ends one of said end flaps having yielding movement in relation to the other end flaps.

6. A minnow-trap comprising sides suitably connected together at their longitudinal edges and having end flaps extending inwardly and forming funnels, the side end flaps being provided with straddling lips, as and for the purpose specified.

ARTHUR JOHN ALGATE.

Witnesses:
B. BYD,
E. McEACHERN.